Aug. 18, 1942.  G. A. LYON  2,293,067
WHEEL STRUCTURE AND ASSEMBLY
Filed Dec. 21, 1939  2 Sheets-Sheet 1
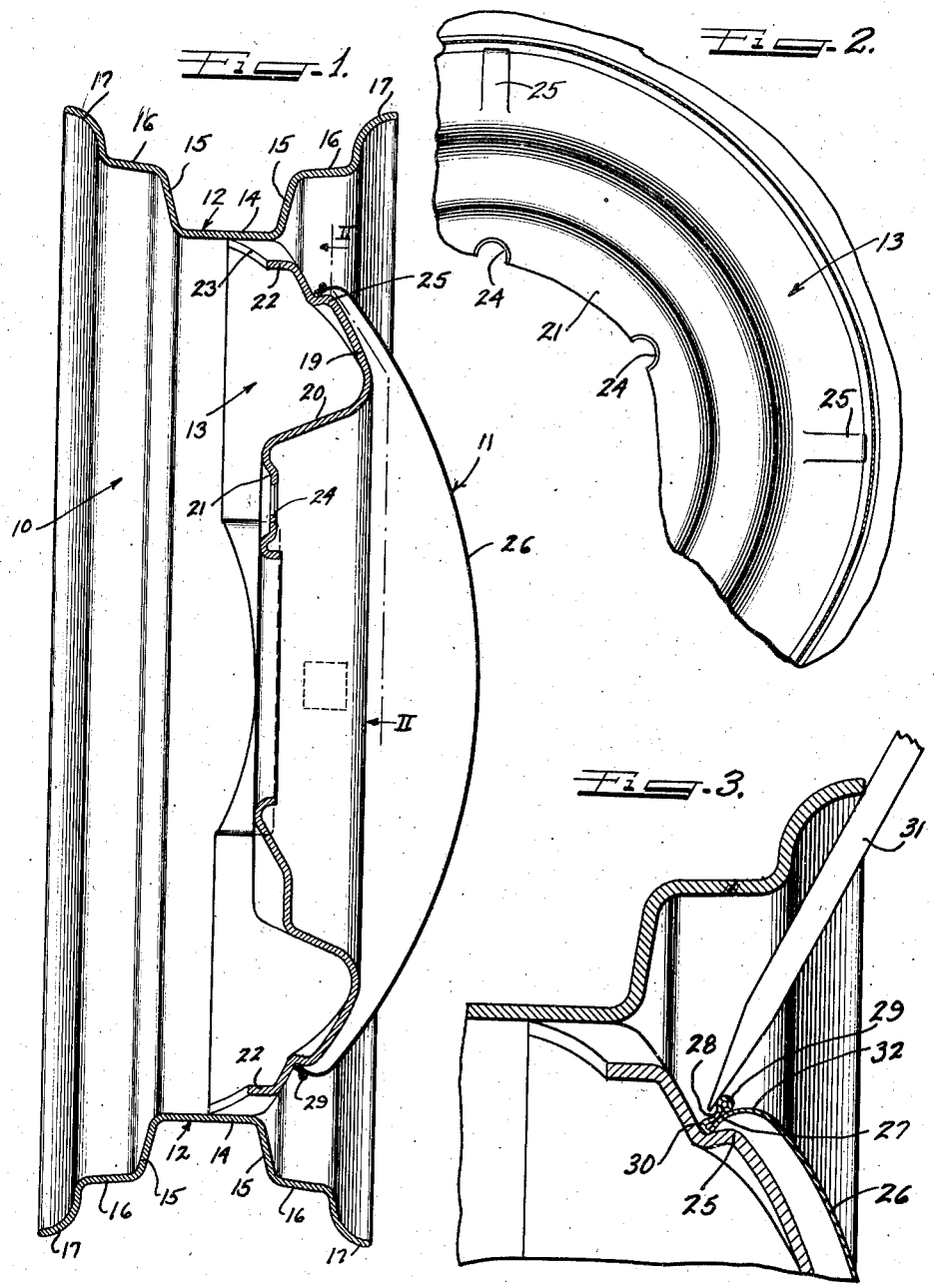
Inventor
GEORGE ALBERT LYON.

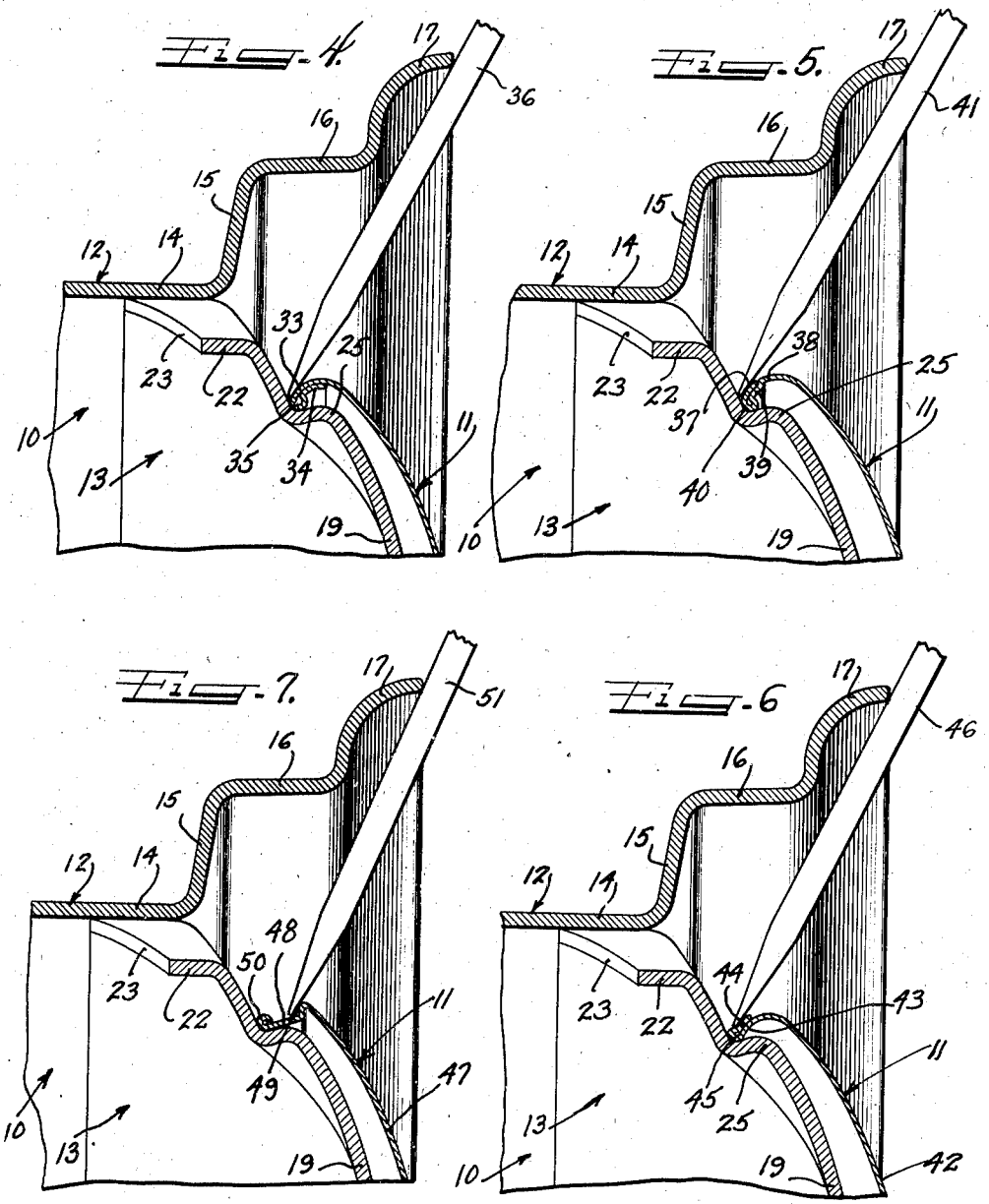

Patented Aug. 18, 1942

2,293,067

UNITED STATES PATENT OFFICE 2,293,067

WHEEL STRUCTURE AND ASSEMBLY

George Albert Lyon, Allenhurst, N. J.

Application December 21, 1939, Serial No. 310,332

4 Claims. (Cl. 301—37)

This invention relates to a wheel structure and assembly, and more particularly to a novel wheel member or wheel cover which cooperates with a vehicle wheel in a novel manner and which is designed in such a manner as to enable the use of very thin sheet metal stock in the wheel cover.

The majority of vehicle wheels of today are equipped with ornamental wheel members or wheel covers over a substantial part of their outer surfaces. The use of these wheel covers permits a more economical manufacture of vehicle wheels, since the wheels themselves may be designed solely for strength and utility without regard to ornamental appearance, the wheel covers being employed for the latter purpose. The most popular form of wheel cover at the present time is one having a highly polished exterior surface. The exterior surface of the wheel cover may, of course, be finished in any other suitable manner, such as by enameling or the like.

In order to minimize the total cost of the wheel assembly, it is necessary to minimize the cost of the wheel disk as well as that of the wheel as much as possible. The thinner the sheet metal stock is which is employed to make the wheel cover, the greater the saving in the manufacturing cost. It has been found that a wheel disk or cover may be constructed of sheet metal stock which is extremely thin when it is properly designed to resist mounting and removal stresses at certain or particular localities.

It is an object of the present invention to provide a novel wheel structure or wheel member for disposition on a wheel.

Another object of the present invention is to provide a novel wheel structure and wheel assembly wherein the wheel structure is made of very thin sheet metal stock and wherein the sheet metal stock is provided with a novel shape to resist and withstand mounting and removal stresses as well as to provide a tight resilient engagement of the wheel structure on the wheel.

A further object of the present invention is to provide a novel wheel structure or wheel cover member having a novel mounting edge for engagement with a wheel.

Another and further object of the present invention is to provide a novel wheel structure or wheel cover member having a marginal portion of novel shape which is substantially non-standing and which facilitates the removal of the wheel cover member from the wheel by a pry or tool.

Another and still further object of the present invention is to provide a novel wheel structure or wheel cover member which is economical to manufacture and which is rugged and reliable in use, and which cooperates with the vehicle wheel in a novel manner.

A still further object of the present invention is to provide a novel wheel cover member or wheel disk having its outer edge portion folded back in a novel manner.

The novel features which I believe to be characteristic of my invention are set forth in particularity in the appended claims. My invention itself, however, both as to its organization and manner of construction, together with further objects and advantages thereof, may best be understood by reference to the following description taken in connection with the accompanying drawings, in which:

Figure 1 is a vertical sectional view of a vehicle wheel and cover assembly;

Figure 2 is a fragmentary front view of a portion of the wheel and wheel cover assembly with a portion of the wheel cover broken away so as to view the assembly along the line II—II of Figure 1;

Figure 3 is an enlarged fragmentary sectional view showing the upper portion of the wheel and wheel cover assembly in Figure 1; and Figures 4, 5, 6, and 7 show enlarged fragmentary sectional views similar to Figure 3, showing different forms of the present invention.

Referring now to the embodiment of the present invention which is illustrated in Figures 1, 2 and 3, there is shown a wheel assembly comprising a vehicle wheel 10 and a wheel cover or wheel disk 11. The wheel 10 comprises a rim part 12 and a body part 13. The rim 12 is of the usual drop center type and includes a base flange 14, opposite intermediate side flanges 15 opposite intermediate base flanges 16 and opposite edge portion 17. The drop center rim 12 as illustrated is of the type commonly employed in the automotive vehicle art of the present day, and, as is well known to those skilled in the art, is arranged to receive and accommodate a pneumatic tire (not shown).

The body part 13 and wheel 10 includes, in general, a rearwardly extending outer flange 18, an outer web portion 19, a generally axially rearwardly and slightly radially inwardly extending inner web portion 20, and a radially inwardly extending wheel mounting flange 21. The rearwardly extending outer flange 18 is secured to the under side of the base flange 14 of the rim 12 in any suitable manner, such as by welding or riveting (not shown). The circumferentially spaced portions of the flange 18 are depressed radially inwardly as at 22 to permit circulation of air through the wheel. The rear edges 23 of the depressed portion 22 are cut back as is clearly shown in Figure 1 of the drawings.

The wheel mounting flange 21 is provided with an annular series of apertures 24 for the reception of the usual wheel mounting bolts (not shown), which bolts are arranged to extend therethrough and to engagement with the hub portion or brake drum of the vehicle (not shown).

The outer web portion 19 is provided with a plurality of circumferentially spaced radially outwardly projecting short ribs or protuberances 25. These short ribs 25 may be formed on the wheel 10 in any suitable manner, and may be initially separate pieces which are welded or otherwise secured to the wheel, or they may be integral with the wheel as is shown in Figure 1 and formed by pressing up portions of the web 19. As is indicated in Figures 1 and 2, four of these short ribs or protuberances are employed in the embodiment of the invention illustrated and described herein.

The wheel cover or wheel disk 11 includes in general a central dome-shaped portion 26 and an obliquely rearwardly and radially inwardly extending outer marginal portion or flange 27. The rear edge of the outer marginal portion 27 is bent back on itself as at 28 and terminates in a rolled edge or bead 29 the place at which the portion 28 is folded back on the portion 27 is preferably not a tight crease but is rather given a bead-like roll as at 30. From a close inspection of Figure 3, it will be observed that the folded back portion 28 lies flush against a portion of the obliquely rearwardly extending flange 27.

The particular folded flange formation which has been described above, greatly stiffens the wheel cover member 11 in the region where it is sprung over the projecting ribs or protuberances 25 and also at the point where the cover member 11 is engaged by a pry off tool 31 when the cover member is to be removed from the wheel. It will thus be understood that the cover member 11 is reinforced and strengthened in the region where the principle stresses occur as the cover member 11 is mounted on the wheel 10 and removed therefrom. From that reason extremely thin sheet metal stock may be employed in forming the wheel cover 11.

It will be observed that by virtue of the fact that the flange portion 27 extends obliquely axially rearwardly and radially inwardly an annular bulge is provided as at 32 which conceals a substantial portion of the fold back 28. By shaping the cover member 11 with the annular budge 32 and disposing the flange portion 27 so as to extend obliquely axially rearwardly and radially inwardly the principle flexing of the wheel cover member 11 is localized in the region of the flange 27 and is not transmitted to the central dome-shaped portion 26.

When the wheel cover member 11 is mounted on the wheel 10, the continuous circular flexible bead portion 30 is sprung or flexed over the rigid protuberances 25 on the wheel 10 and the wheel cover member 11 is thereafter held in tight resilient engagement on the wheel by virtue of its own inherent resiliency.

When it is desired to remove the wheel cover member 11 from the wheel 10 the blunt end of the pry off tool 31 (as shown in Figure 3) is inserted behind the bead 29, and the pry off tool is then pressed against an edge of the tire rim 12 so that a pry off force may be applied directly to the reinforced portion of the wheel cover member 11. When thus pried loose, the cover member 11 is, after the application of a given amount of pressure, forcibly ejected or sprung loose from the protuberances 25.

It will also be perceived that by making the closure or cover member 11 of springy material, such, for example, as stainless steel, I am able to provide the crown or central dome-shaped portion 26 with sufficient resiliency that it will serve to resist yieldably permanent indentation. That is to say, if any pebbles or the like strike this face portion 26 of the cover member 11, the blows imparted to the face portion will be resiliently resisted by the natural springiness of the face portion 26. As a consequence, any slight indentation in the face portion 26 will be sufficiently repelled so that the face portion will readily flex back to its original shape or may be easily snapped back to that shape upon a slight manual pressure upon the inside surface of the face portion.

In Figure 4 of the drawings a modified form of the present invention is illustrated wherein the wheel cover member 11 is provided with a generally curved obliquely axially rearwardly and radially inwardly extending flange portion 33 which terminates in a folded back portion 34. At the junction of the folded back portion 34 with the flange portion 33, an enlarged bead is provided, as at 35, which is arranged to be sprung or flexed over the rigid protuberances 25 on the wheel 10. The wheel 10 is of the same type as has been illustrated and described in connection with Figure 1 of the drawings.

As will readily be seen from an inspection of Figure 4, a double thickness of metal is provided in the wheel cover member 11 at the point where the greatest stresses occur. The beaded portion 35 in conjunction with the annular portion 34 provide a relative stiff yet flexible continuous flexible edge for the wheel cover member 11 which may be sprung over the rigid protuberances 25. The flange portion 33 is disposed at such an angle that a pry off tool 36 may be readily inserted therebehind and thereafter fulcrumed on the outer edge 17 of the rim 12 to remove the wheel cover member 11 from the wheel 10; it will be observed that the pry off tool 36 is also applied to a portion of the wheel cover member which is reinforced.

In Figure 5 of the drawings a further modification of the present invention is illustrated in the wheel cover member 11. The wheel cover member 11 in this form of the invention has an outer edge portion which is folded outwardly back on itself as at 37. The obliquely axially rearwardly and radially inwardly extending flange portion 38 in this case, however, has an offset or stepdown portion 39 against and on which the folded back portion 37 is seated. An annular bead 40 is provided at the fold which is arranged to be sprung over the rigid protuberances 25 on the wheel 10.

The disposition of the fold back portion 37 of the form of the invention shown in Figure 5 and the flange 38 is such that a pry off tool 51 may be readily engaged therewith, as is shown in Figure 5, for removal of the wheel cover member 11 from the wheel 10. It will be observed that a double thickness of metal is located at the point where the pry off tool engages the wheel cover member 11. It will thus be understood that the two principal places of stress, namely, the edge portion which is flexed over the rigid protuberances on the wheel and the place of engagement by a pry off tool are both strongly reinforced by virtue of the particular design employed. It will thus be understood that extremely thin sheet metal stock may be employed in the wheel cover member 11.

In Figure 6 of the drawings a modified form of wheel cover member is shown which is similar to that shown in Figures 1 and 3 but in which the bead roll portion 29 of Figure 3 has been removed. More particularly the wheel cover member 11 in the form of the invention shown in Figure 6 includes a central dome-shaped portion 42 an obliquely axially rearwardly and radially inwardly extending flange portion 43 and a fold back portion 44 which is pressed tightly against the flange portion 43 except at the bead 45 where the fold occurs. The bead 45 is continuous and flexible as has previously been described and is arranged to be sprung over the rigid protuberances 25 on the wheel 10. A pry off tool 46 is arranged to be inserted behind the flange portion 43 against the fold back portion 44 to pry the wheel cover member loose from the wheel 10. In this form of the invention a double thickness of metal is provided where the pry off tool engages the wheel cover member 11 and a strongly reinforced edge portion is provided on the wheel cover member 11 where it is to be sprung over the rigid protuberances 25 on the wheel 10.

In Figure 7 of the drawings a further modification of the present invention is illustrated, more particularly the wheel cover member 11 is provided with a dome-shaped central portion 47 and a generally obliquely axially rearwardly and radially inwardly extending flange portion 48. The central dome-shaped portion 47 merges into and is connected to the flange portion 48 by a radially inwardly extending shoulder 49. The rear edge of the flange portion 48 is curled or rolled outwardly to form a continuous circular flexible bead 50. The rolled metal forming the bead 50 is substantially one complete turn. The roll or bead 50 provides the necessary stiffness in the wheel cover member 11 for engagement with the rigid protuberances 25 on the wheel 10. The shoulder 49 provides a convenient engagement area for a pry off tool 51. The arrangement of the shoulder 49 between the flange portion 48 and the central dome-shaped portion 47 also has the distinct advantage of substantially confining the flexing in the wheel cover member 11, as it is sprung over the rigid protuberances 25, to the region of the flange and prevents stressing and distortion of the central dome-shaped portion 47. This is extremely desirable since it enables the use of material which is extremely thin and which, if some arrangement were not provided for localizing the stressing of the member would require thicker material in the dome-shaped portion to prevent distortion and flexing thereof.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A circular wheel cover member of thin metallic sheet material having a flange portion arranged to be sprung over rigid attaching means on a wheel, said flange portion having a folded back rear edge portion, said folded back portion being bent to provide double beads in close proximity to each other and to provide a reinforced continuous flexible circular edge for flexible cooperation with said rigid attaching means on said wheel, one of said beads being arranged for engagement by a pry-off tool to remove said wheel cover member from said wheel and the other of said beads being arranged for direct resilient cooperation with said rigid attaching means on said wheel.

2. A circular wheel cover member of thin metallic sheet material having a flange portion arranged to be sprung over rigid attaching means on a wheel, said flange portion having an edge portion folded and laid back on itself to provide a reinforced edge serving the dual purpose of providing a reinforced continuous circular edge for flexible cooperation with said rigid attaching means on said wheel and also providing a reinforced portion behind which a pry-off tool may be inserted and against which the tool bears to remove said wheel cover member from said wheel, the portion of said flange opposite the folded and laid back portion being offset and said folded back portion being pressed tightly against said offset portion.

3. A circular wheel cover member of thin metallic sheet material having a flange portion arranged to be sprung over rigid attaching means on a wheel, said flange portion having an edge portion thereof folded inwardly back on itself and terminating in a lip seated on the radial inner face of said flange, said folded back portion providing a reinforced edge which serves the dual purpose of providing a continuous circular edge for flexible cooperation with said rigid attaching means on said wheel and also a reinforced portion behind which a pry-off tool may be inserted and against which the tool bears to remove said wheel cover member from said wheel.

4. In a wheel structure, a wheel including rim and body parts, one of said parts having a plurality of spaced rigid protuberances arranged in a common circle, a circular cover member of thin metallic sheet material having a dome-like body terminating in a rearwardly extending continuous circular flange flexible into retaining engagement with said protuberances, said flange having its rear marginal portion curved to form a continuous circular bead at the rear extremity of said flange, the marginal part of said flange forming said bead being turned axially and radially outwardly back upon said flange and being seated on a portion of said flange, said turned marginal part of said flange thus cooperating with said flange to provide the flange with said bead which is of a multiple thickness at the place of cooperation of said cover with said protuberances.

GEORGE ALBERT LYON.